(12) United States Patent
Wang et al.

(10) Patent No.: US 10,025,498 B2
(45) Date of Patent: Jul. 17, 2018

(54) SCREEN UNLOCKING METHOD AND APPARATUS

(71) Applicant: Xiaomi Inc., Beijing (CN)

(72) Inventors: Guangjian Wang, Beijing (CN); Ruixian Zhu, Beijing (CN); Yixing Zou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/384,747

(22) Filed: Dec. 20, 2016

(65) Prior Publication Data

US 2017/0177209 A1    Jun. 22, 2017

(30) Foreign Application Priority Data

Dec. 21, 2015    (CN) .......................... 2015 1 0967643

(51) Int. Cl.
*G06F 3/0488*    (2013.01)
*G06F 3/041*    (2006.01)

(52) U.S. Cl.
CPC ........ *G06F 3/04883* (2013.01); *G06F 3/0414* (2013.01)

(58) Field of Classification Search
CPC ...... G06F 3/045; G06F 3/011; G06F 3/04883; G06F 3/0414; G06F 3/0488; G06F 3/041
See application file for complete search history.

(56) References Cited

U.S. PATENT DOCUMENTS

| | | | |
|---|---|---|---|
| 2009/0079704 A1* | 3/2009 | Huang | G06F 3/0412 345/173 |
| 2010/0302177 A1* | 12/2010 | Kim | G06F 3/04883 345/173 |
| 2013/0069897 A1* | 3/2013 | Liu | G06F 3/0488 345/173 |
| 2013/0318598 A1 | 11/2013 | Meacham | |
| 2013/0328793 A1* | 12/2013 | Chowdhury | G06F 3/041 345/173 |
| 2014/0111451 A1 | 4/2014 | Park et al. | |
| 2014/0201833 A1 | 7/2014 | Wang | |

(Continued)

FOREIGN PATENT DOCUMENTS

| | | |
|---|---|---|
| CN | 102508614 A | 6/2012 |
| CN | 103257809 A | 8/2013 |

(Continued)

OTHER PUBLICATIONS

International Search Report and Written Opinion for International Application No. PCT/CN2016/087491 dated Sep. 26, 2016.

(Continued)

*Primary Examiner* — Md Saidul A Siddiqui
(74) *Attorney, Agent, or Firm* — Finnegan, Henderson, Farabow, Garrett & Dunner LLP

(57) ABSTRACT

A screen unlocking method includes obtaining a sliding path on a screen when a preset operation on the screen is detected. The screen unlocking method also includes determining a similarity between the sliding path and a preset unlocking pattern. The screen unlocking method further includes unlocking the screen and illuminating the screen when the similarity between the sliding path and the preset unlocking pattern is greater than or equal to a preset threshold.

16 Claims, 10 Drawing Sheets

(56) References Cited

U.S. PATENT DOCUMENTS

| | | | | |
|---|---|---|---|---|
| 2015/0100911 A1* | 4/2015 | Yin | ..................... | G06F 3/04883 |
| | | | | 715/773 |
| 2016/0065838 A1* | 3/2016 | Chen | .................. | H04N 5/23216 |
| | | | | 348/333.02 |
| 2016/0103538 A1* | 4/2016 | Cheng | ................... | G06F 3/0412 |
| | | | | 345/173 |

FOREIGN PATENT DOCUMENTS

| | | | |
|---|---|---|---|
| CN | 103823632 | A | 5/2014 |
| CN | 104020958 | A | 9/2014 |
| CN | 104090725 | A | 10/2014 |
| CN | 104571894 | A | 4/2015 |
| CN | 104915118 | A | 9/2015 |
| CN | 104994105 | A | 10/2015 |
| CN | 105095733 | A | 11/2015 |
| CN | 105426741 | A | 3/2016 |

OTHER PUBLICATIONS

English translation of International Search Report for International Application No. PCT/CN2016/087491 dated Sep. 26, 2016.
Extended European Search Report for European Patent Application No. 16203889.7 dated May 17, 2017.
Chinese Office Action issued by the State Intellectual Property Office of the People's Republic of China (SIPO) for Chinese Application No. 201510967643.8, dated Oct. 27, 2017.

\* cited by examiner

Smart phone

SCREEN UNLOCKING METHOD AND APPARATUS

CROSS-REFERENCE TO RELATED APPLICATION

This application is based on and claims priority to Chinese Patent Application Serial No. 201510967643.8, filed with the State Intellectual Property Office of P. R. China on Dec. 21, 2015, the entire content of which is incorporated herein by reference.

FIELD

The present disclosure relates to the field of terminal technology, and more particularly, to a screen unlocking method and a screen unlocking apparatus.

BACKGROUND

In related art, a pattern unlocking function has been used for unlocking a screen of a terminal such as a mobile phone. However, for unlocking the screen, it is required to illuminate the screen first, before the unlocking pattern is entered by a user, which not only wastes battery power, but is also difficult to operate, resulting in inconvenience to a user and poor user experience.

SUMMARY

The present disclosure provides a screen unlocking method, a screen unlocking apparatus and a terminal.

According to a first aspect of the present disclosure, a screen unlocking method is provided. The method includes obtaining a sliding path on a screen when a preset operation on the screen is detected. The screen unlocking method also includes determining a similarity between the sliding path and a preset unlocking pattern. The screen unlocking method further includes unlocking the screen and illuminating the screen when the similarity between the sliding path and the preset unlocking pattern is greater than or equal to a preset threshold.

According to a second aspect of the present disclosure, a terminal is provided. The terminal includes a processor and a memory configured to store instructions executable by the processor. The processor is configured to obtain a sliding path on a screen when a preset operation on the screen is detected. The processor is also configured to determine a similarity between the sliding path and a preset unlocking pattern. The processor is further configured to unlock the screen and illuminate the screen when the similarity between the sliding path and the preset unlocking pattern is greater than or equal to a preset threshold.

According to a third aspect of the present disclosure, a non-transitory computer-readable storage medium is provided. The non-transitory computer-readable storage medium has instructions stored therein that, when executed by a processor of a terminal, cause the terminal to perform a screen unlocking method. The method includes obtaining a sliding path on a screen when a preset operation on the screen is detected. The method also includes determining a similarity between the sliding path and a preset unlocking pattern. The method further includes unlocking the screen and illuminating the screen when the similarity between the sliding path and the preset unlocking pattern is greater than or equal to a preset threshold.

It should be understood that the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses, terminals, and methods consistent with aspects related to the present disclosure as recited in the appended claims.

Terms used in the present disclosure are merely for describing particular embodiments, rather than for limiting the present disclosure. For example, singular form "a" and "the" used in the present disclosure and the appended claims are intended to include plural forms, unless clearly expressed in the context. It should be also understood that, term "and/or" used herein means any combination or all possible combinations of one or more listed items before and after the term "and/or."

It should be understood that, although terms such as "first," "second," and "third" are used to describe respective information in the present disclosure, the information is not limited to these terms. These terms are merely used to distinguish information of the same or similar type. For example, without departing from the scope of the present disclosure, first information may also be referred to as second information, and similarly, second information may also be referred to as first information. Depending on the context, the word "if . . . " used herein can be interpreted as "when . . . ", "upon . . . ", or "in response to determining . . . ."

Figure 1:
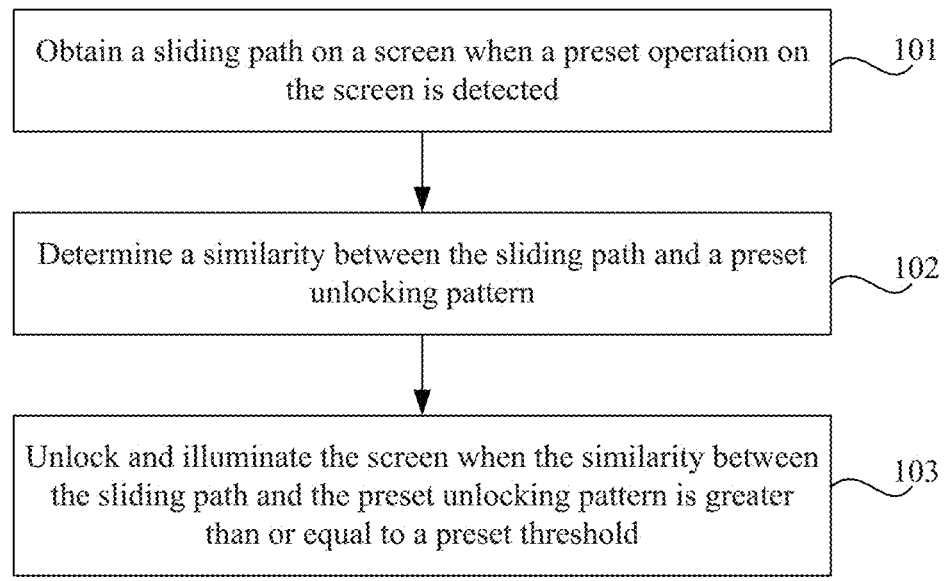
FIG. 1 is a flowchart of a screen unlocking method according to an exemplary embodiment of the present disclosure.

FIG. 1 is a flowchart of a screen unlocking method according to an exemplary embodiment of the present disclosure. The method can be implemented by or in a terminal. The method includes steps 101-103.

In step 101, a sliding path on a screen is obtained when a preset operation on the screen is detected. In one embodiment, the sliding path is input by a user of the terminal on the screen, and the preset operation is a preset operation of the user.

The terminal may be any smart terminal, such as one having a web-surfing function. For example, the terminal may be a mobile phone, a tablet, a PDA (Personal Digital Assistant), etc. The terminal can access a router via a wireless LAN (Local Area Network), and access a server on a public network via the router. In some embodiments, the terminal supports a pattern unlocking function.

In step 102, a similarity between the sliding path and a preset unlocking pattern is determined.

In step 103, the screen is unlocked and illuminated when the similarity between the sliding path and the preset unlocking pattern is greater than or equal to a preset threshold.

In some embodiments, the terminal obtains the sliding path at any location on the screen when the preset operation on the screen is detected. The terminal unlocks the screen and illuminates the screen when the similarity between the sliding path and the preset unlocking pattern is greater than or equal to the preset threshold. In this manner, the terminal enables a user to unlock the screen by drawing the unlocking pattern of any size at any location on the screen, without the need of pressing the power button and without the need of illuminating the whole screen. As a result, the disclosed terminal simplifies and facilitates the user operation for unlocking the screen, thereby reducing energy consumption associated with illuminating the screen and improving user experience.

Figure 2:
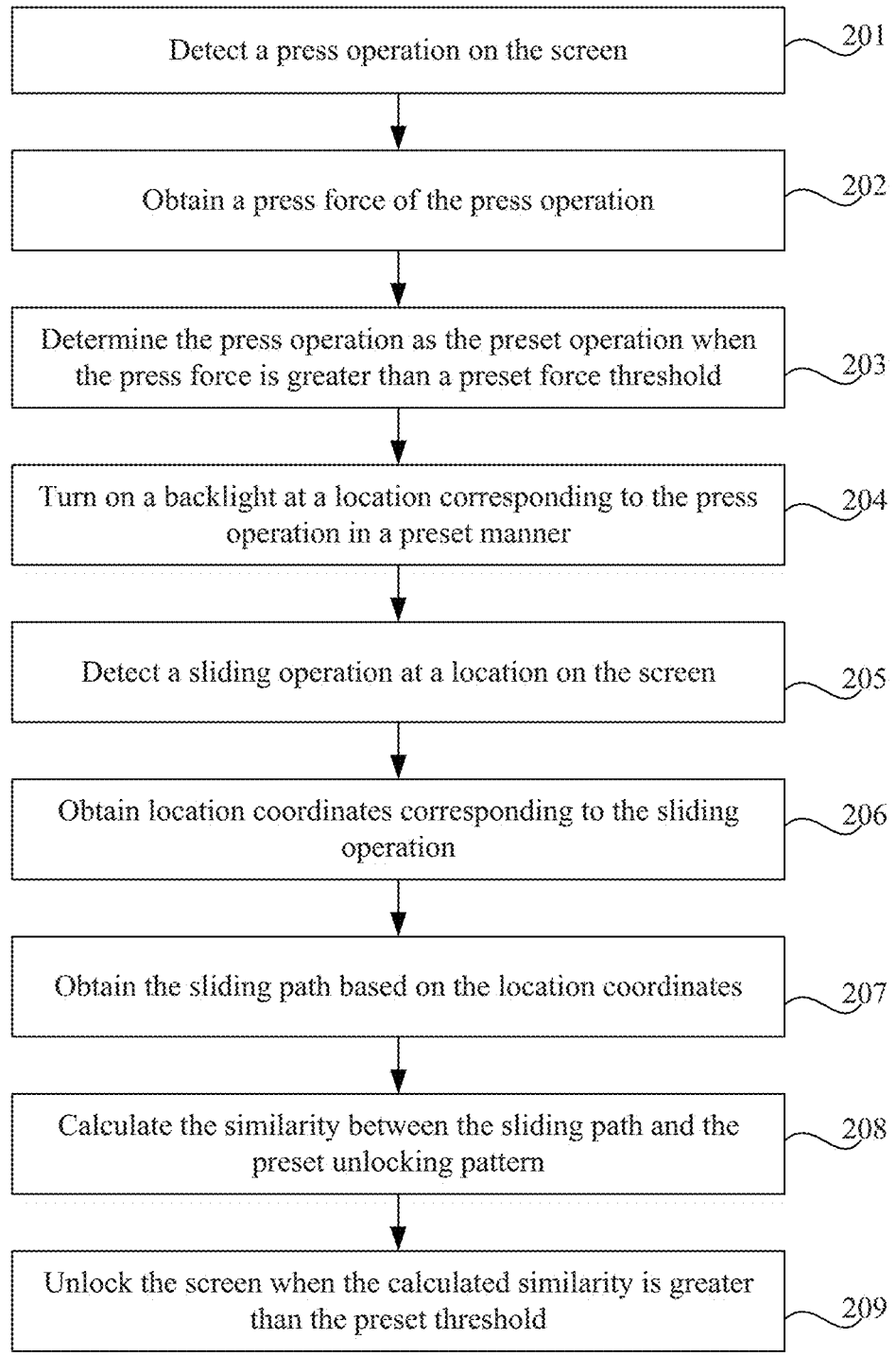
FIG. 2 is a flowchart of another screen unlocking method according to an exemplary embodiment of the present disclosure.

FIG. 2 is a flowchart of another screen unlocking method according to an exemplary embodiment of the present disclosure. The method can be implemented by or in a terminal. The method shown in FIG. 2 is based on the embodiment shown in FIG. 1. Step 101 shown in FIG. 1 includes the following steps shown in FIG. 2.

In step 201, a press operation on the screen is detected.

In step 202, a press force of the press operation is obtained.

In step 203, the press operation is determined as the preset operation when the press force is greater than a preset force threshold.

In some embodiments, the terminal sets the preset force threshold in advance. When the press force of the detected press operation is greater than the preset force threshold, the terminal further determines the sliding path on the screen.

In some embodiments, the terminal obtains a press duration of the press operation on the screen, and determines the press operation as the preset operation when the press duration is within a preset duration range. The preset operation may be in multiple forms. For example, in some embodiments, the preset operation is a press operation having an operation area satisfying a preset condition. In some embodiments, the preset operation is a predetermined number of tapping operations on the screen. For example, the preset operation may be tapping the screen two or more times continuously. In some embodiments, the terminal obtains a number of tapping operations on the screen, and obtains the sliding path on the screen when the number of tapping operations on the screen satisfies a preset value (e.g., greater than or equal to two, three, four, or any suitable preset number).

It may be determined whether the operation by the user on the screen matches the preset operation by executing steps 201-203. When the operation by the user on the screen matches the preset operation, steps 204 and 205 are further executed.

In step 204, a backlight at a location corresponding to the press operation is turned on in a preset manner.

In some embodiments, when the preset operation by the user on the screen is detected, only the backlight at the press location is turned on. In some embodiments, the backlight may be kept on for a preset period such as 3 seconds, or the backlight may flash a preset times such as 3 times, without the need of illuminating the entire screen. In this manner, not only the battery power is saved, it also reminds the user that the terminal has detected the press operation and a next operation of inputting the unlocking pattern can be executed.

In some embodiments, for obtaining the sliding path input by the user on the screen, steps 205-207 are executed.

In step 205, the sliding operation at a location on the screen is detected. The sliding operation may be detected at any location on the screen.

In some embodiments, the user draws the unlocking pattern by performing the sliding operation on the screen. To unlock the screen, the user may draw the unlocking pattern at any location on the screen without limiting the size and location of the pattern.

In step 206, location coordinates corresponding to the sliding operation are obtained.

In step 207, the sliding path is obtained based on the location coordinates.

In some embodiments, backlights at locations corresponding to the sliding path are turned on. For example, the path may be illuminated as the sliding operation of the user is carried out, or the entire path is illuminated after the user has completed the sliding operation. The disclosed methods eliminate the need of illuminating the entire screen, thereby facilitating the user to check whether the unlocking pattern is correct and reducing energy consumption associated with illuminating the screen.

In some embodiments, the procedure of obtaining the sliding path input by the user on the screen is executed as follows. The terminal obtains the press force at a beginning point of the sliding operation and determines whether the press force is greater than the preset force threshold. When the press force is greater than the preset force threshold, the terminal determines that the user is executing an unlocking operation.

In some embodiments, when the sliding path input by the user on the screen is detected after the preset operation input by the user on the screen is detected, the terminal illuminates the sliding path on the screen simultaneously as the sliding operation is carried out by the user or illuminates the sliding path after the user completes the sliding path.

In some embodiments, after the sliding path input by the user on the screen is obtained, the following steps are executed.

In step 208, a similarity between the sliding path and the preset unlocking pattern is calculated.

In some embodiments, the unlocking pattern is preset. For example, the unlocking pattern may be drawn by a user through a function provided in the terminal. The terminal may save the drawn pattern confirmed by the user.

In step 209, the screen is unlocked when the similarity calculated is greater than the preset threshold.

In some embodiments, the similarity is calculated using the following methods.

First, the pattern corresponding to the sliding path and the preset unlocking pattern are transformed to have a same size, for example, 256*256, to generate respective transformed patterns. Exemplary codes for implementing the transformation are shown as follows.

```
public Bitmap Resize(string imageFile, string newImageFile)
{
img = Image.FromFile(imageFile);
Bitmap imgOutput = new Bitmap(img, 256, 256);
imgOutput.Save(newImageFile,
    System.Drawing.Imaging.ImageFormat.Jpeg);
imgOutput.Dispose( );
return (Bitmap)Image.FromFile(newImageFile);
}
```

Then, histograms of the transformed patterns are calculated. Exemplary codes for implementing calculation of the historgrams are shown as follows.

public int[ ] GetHistogram(Bitmap img)

Finally, the similarity between the two histograms is calculated using, e.g., the following formula.

$$Sim(G, S) = \frac{1}{N}\sum_{i=1}^{N}\left(1 - \frac{|g_i - s_i|}{\text{Max}(g_i, s_i)}\right)$$

where, G is the histogram of the pattern corresponding to the sliding path, S is the histogram of the unlocking pattern, and N is the number of sampling points in a color space. The absolute value after the subtraction can be calculated using the following exemplary code:
private float GetAbs(int firstNum, int secondNum)

Figure 3:
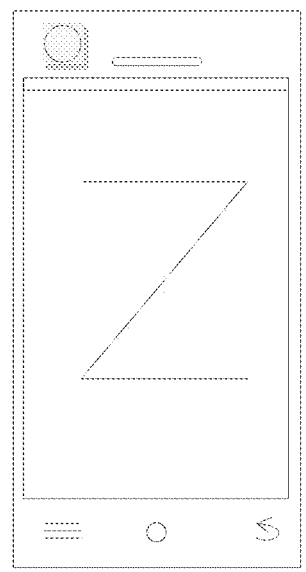
FIG. 3 is a schematic diagram showing an application scenario in which a screen unlocking method is applied according to an exemplary embodiment of the present disclosure.

FIG. 3 is a schematic diagram showing an application scenario in which a screen unlocking method is applied according to an exemplary embodiment of the present disclosure. The scenario shown in FIG. 3 includes a smart phone used as a terminal.

When a user wants to unlock the smart phone, the user presses the screen with a certain force. The terminal detects the press operation, obtains the press force, and determines whether the press force is greater than a preset force threshold. When the terminal determines that the press force is greater than the preset force threshold, the terminal turns on the backlight at a press location. Alternatively or additionally, the terminal causes the backlight to flash one or more times (e.g., 3 times) and then turns off the backlight. Then, the user draws the unlocking pattern "Z" at any location on the screen. The terminal obtains the corresponding sliding path input by the user, compares the sliding path with the preset unlocking pattern to obtain the similarity, and unlocks the screen when the similarity is greater than the preset threshold.

In the application scenario shown in FIG. 3, the specific processes for unlocking the screen have been described above in connection with FIGS. 1-2, which are not repeated.

Corresponding to the disclosed embodiments of the screen unlocking method, the present disclosure also provides embodiments of a screen unlocking apparatus, device, or terminal in which the screen unlocking method is applied.

Figure 4:
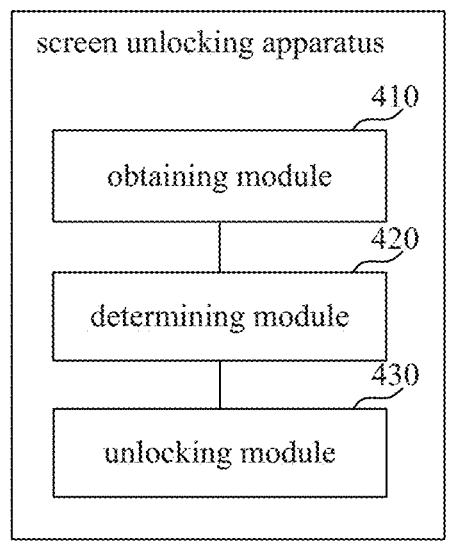
FIG. 4 is a block diagram of a screen unlocking apparatus according to an exemplary embodiment of the present disclosure.

FIG. 4 is a block diagram of a screen unlocking apparatus according to an exemplary embodiment of the present disclosure. The apparatus is configured to implement the method shown in FIG. 1. The apparatus includes an obtaining module 410, a determining module 420, and an unlocking module 430.

The obtaining module 410 is configured to obtain a sliding path input by a user on a screen when a preset operation input by the user on the screen is detected.

The determining module 420 is configured to determine a similarity between the sliding path obtained by the obtaining module 410 and a preset unlocking pattern.

The unlocking module 430 is configured to unlock the screen and illuminate the screen when the determining module 420 determines that the similarity between the sliding path and the preset unlocking pattern is greater than or equal to a preset threshold.

In some embodiments, the terminal obtains the sliding path at any location on the screen when the preset operation on the screen is detected. The terminal unlocks the screen when the similarity between the sliding path and the preset unlocking pattern is greater than the preset threshold. In this manner, the terminal enables the user to unlock the screen by drawing the unlocking pattern of any size at any location on the screen, without the need of pressing the power button and without the need of illuminating the whole screen, thereby simplifying and facilitating the user operation and reducing energy consumption associated with illuminating the screen. As a result, user experience is improved.

Figure 5:
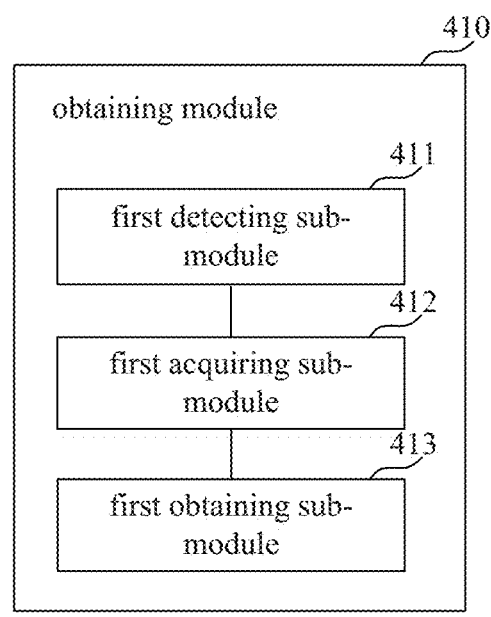
FIG. 5 is a block diagram of another screen unlocking apparatus according to an exemplary embodiment of the present disclosure.

FIG. 5 is a block diagram of another screen unlocking apparatus according to an exemplary embodiment of the present disclosure. As shown in FIG. 5, the obtaining module 410 of FIG. 4 includes a first detecting sub-module 411, a first acquiring sub-module 412, and a first obtaining sub-module 413.

The first detecting sub-module 411 is configured to detect a press operation input by the user on the screen.

The first acquiring sub-module 412 is configured to obtain a press force of the press operation detected by the first detecting sub-module 411.

The first obtaining sub-module 413 is configured to obtain the sliding path input by the user on the screen when the press force obtained by the first acquiring sub-module 412 is greater than or equal to a preset force threshold.

In some embodiments, the terminal sets the preset force threshold in advance. In some embodiments, only when the press force of the detected press operation is greater than or equal to the force threshold, the terminal further determines the sliding path on the screen, thereby avoiding unlocking the screen due to accidental touches or misoperations by the user. The disclosed terminal provides an increased accuracy in unlocking the screen.

Figure 6:
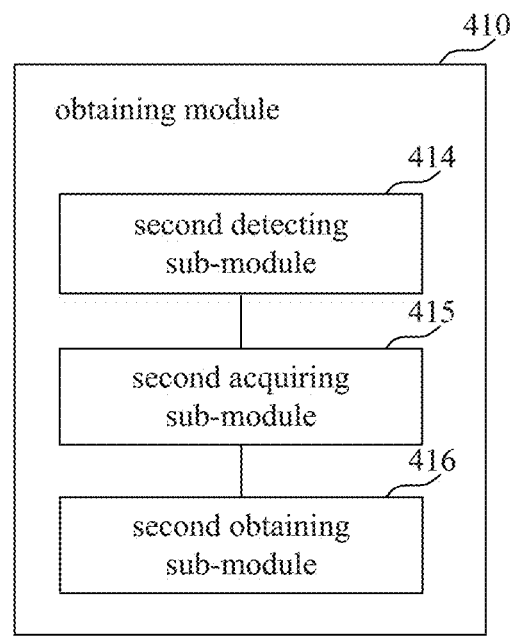
FIG. 6 is a block diagram of yet another screen unlocking apparatus according to an exemplary embodiment of the present disclosure.

FIG. 6 is a block diagram of yet another screen unlocking apparatus according to an exemplary embodiment of the present disclosure. As shown in FIG. 6, the obtaining module 410 of FIG. 4 includes a second detecting sub-module 414, a second acquiring sub-module 415, and a second obtaining sub-module 416.

The second detecting sub-module 414 is configured to detect a press operation input by the user on the screen.

The second acquiring sub-module 415 is configured to obtain a press duration of the press operation detected by the second detecting sub-module 414.

The second obtaining sub-module 416 is configured to obtain the sliding path input by the user on the screen when the press duration obtained by the second acquiring module 415 is within a preset duration range.

In some embodiments, the terminal sets the preset duration range in advance. In some embodiments, only when the press duration of the detected press operation is within the preset duration range, the terminal further determines the sliding path on the screen, thereby avoiding unlocking the screen due to accidental touches or misoperations by the user. The disclosed terminal provides an increased accuracy in unlocking the screen.

Figure 7:
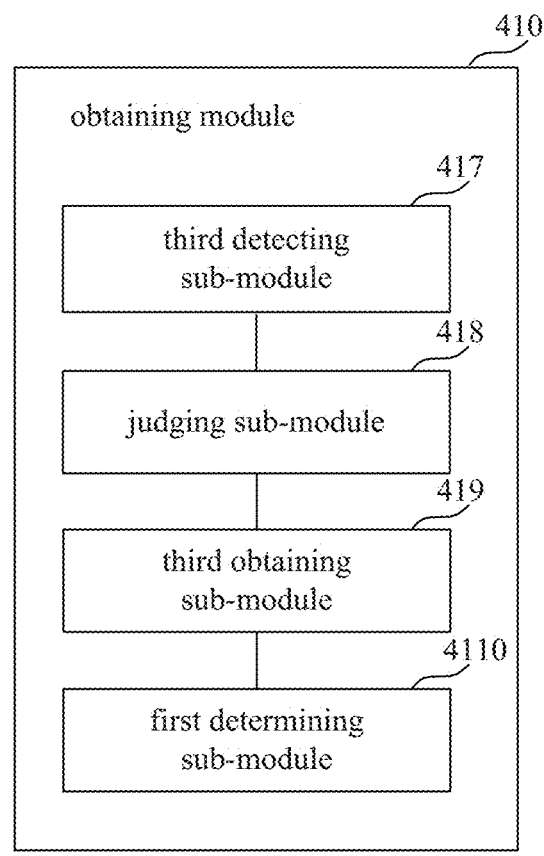
FIG. 7 is a block diagram of yet another screen unlocking apparatus according to an exemplary embodiment of the present disclosure.

FIG. 7 is a block diagram of yet another screen unlocking apparatus according to an exemplary embodiment of the present disclosure. As shown in FIG. 7, the obtaining module 410 of FIG. 4 includes a third detecting sub-module 417, a judging sub-module 418, a third obtaining sub-module 419, and a first determining sub-module 4110.

The third detecting sub-module 417 is configured to detect a sliding operation input by the user at any location of the screen.

The judging sub-module 418 is configured to judge or determine whether a press force of the sliding operation detected by the third detecting sub-module 417 at a beginning point is greater than a preset force threshold.

The third obtaining sub-module 419 is configured to obtain location coordinates corresponding to the sliding operation when the judging sub-module 418 determines that the press force is greater than the preset force threshold.

The first determining sub-module 4110 is configured to determine the sliding path based on the location coordinates obtained by the third obtaining sub-module 419.

In some embodiments, in order to further avoid unlocking the screen due to accidental touches or misoperations, the terminal obtains the press force at the beginning point of the sliding operation, and determines whether the press force is greater than the force threshold. Only when the press force at the beginning point of drawing the unlocking pattern is greater than the force threshold, the terminal determines that the user is executing the unlocking operation and further determines the unlocking pattern input by the user.

Figure 8:
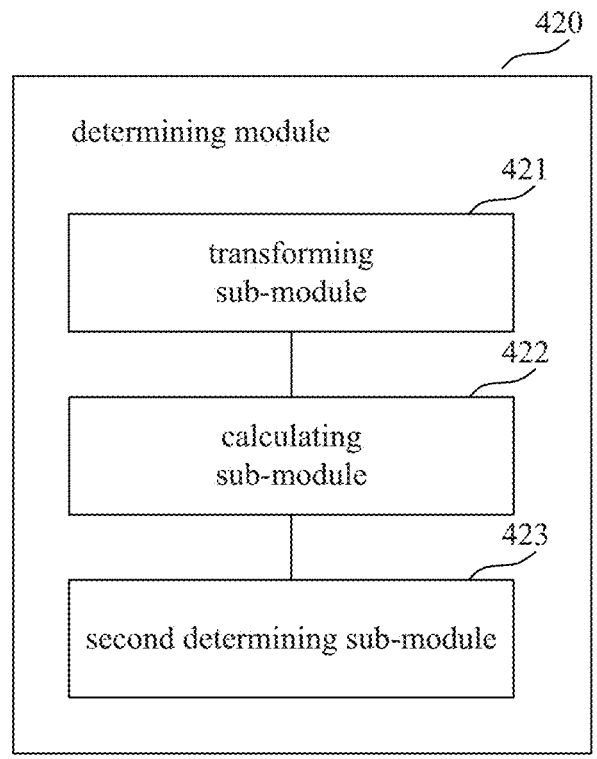
FIG. 8 is a block diagram of yet another screen unlocking apparatus according to an exemplary embodiment of the present disclosure.

FIG. 8 is a block diagram of yet another screen unlocking apparatus according to an exemplary embodiment of the present disclosure. In the embodiment shown in FIG. 8, the determining module 420 of FIG. 4 includes a transforming sub-module 421, a calculating sub-module 422, and a second determining sub-module 423.

The transforming sub-module 421 is configured to transform a pattern corresponding to the sliding path to have a same size as a preset unlocking pattern.

The calculating sub-module 422 is configured to calculate a histogram of a pattern corresponding to the sliding path transformed by the transforming sub-module 421 (the pattern is also referred to as a transformed pattern). The calculating sub-module 422 is also configured to calculate a histogram of the preset unlocking pattern.

The second determining sub-module 423 is configured to calculate the similarity between the sliding path and the preset unlocking pattern according to a similarity between the two histograms calculated by the calculating sub-module 422.

Figure 9:
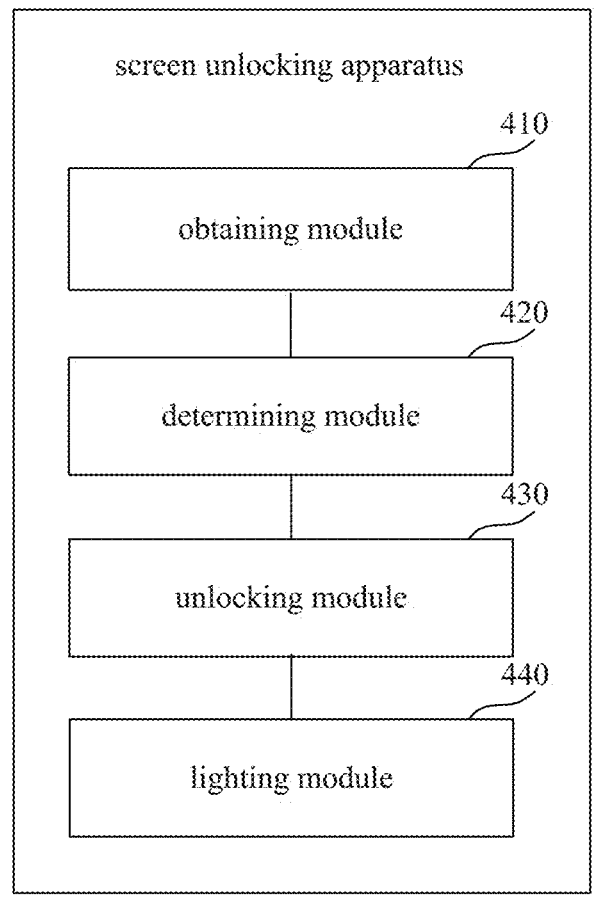
FIG. 9 is a block diagram of yet another screen unlocking apparatus according to an exemplary embodiment of the present disclosure.

FIG. 9 is a block diagram of yet another screen unlocking apparatus according to an exemplary embodiment of the present disclosure. Based on embodiments shown in any one of FIGS. 4-8, the apparatus shown in FIG. 9 further includes an illuminating module 440.

The lighting module 440 is configured to illuminate the sliding path input by the user on the screen when the sliding path input by the user on the screen is detected after the preset operation input by the user on the screen is detected.

Embodiments of the screen unlocking apparatus shown in FIGS. 4-9 can be applied in or as a terminal.

Functions performed by respective modules included in the disclosed apparatuses have already been described above with respect to the disclosed methods, which are not repeated.

Apparatus embodiments described above are merely exemplary, in which units described as separate elements may or may not be physically separated, and elements displayed as units may be or may not be physical units. That is, units may be located at a same place, or may be distributed over one or more networks or networked places. Some or all of the modules may be chosen according to actual demands for achieving the purpose of the present disclosure, which may be understood and implemented by those skilled in the art without creative labor.

Corresponding to FIG. 4, the present disclosure also provides a terminal. The terminal includes a processor and a memory configured to store instructions executable by the processor. The processor is configured to: obtain a sliding path input by a user on a screen when a preset operation input by the user on the screen is detected; determine a similarity between the sliding path and a preset unlocking pattern; and unlock and illuminate the screen when the similarity between the sliding path and the preset unlocking pattern is greater than or equal to a preset threshold.

Figure 10:
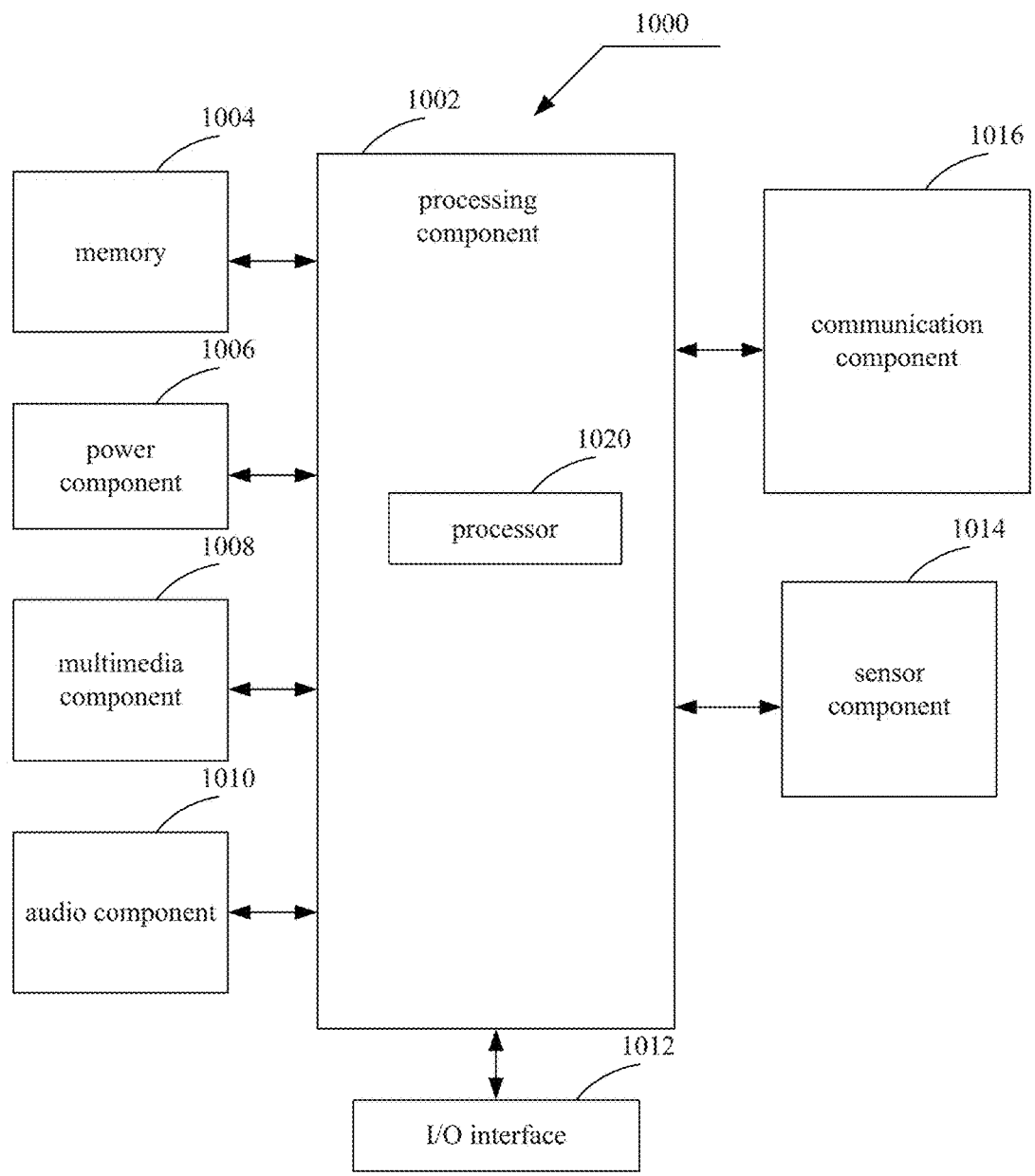
FIG. 10 is a block diagram of a device for unlocking a screen according to an exemplary embodiment of the present disclosure.

FIG. 10 is a block diagram of a device 1000 for unlocking a screen according to exemplary embodiments of the present disclosure. The device 1000 may be an embodiment of a terminal. In some embodiments, the device 1000 may include a routing function. The device 100 may be a mobile phone, a computer, a digital broadcasting terminal, a messaging device, a game console, a tablet device, a fitness equipment, a medical device, a Personal Digital Assistant (PDA), etc.

Referring to FIG. 10, the device 1000 includes one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 is configured to control overall operations of the device 1000, such as the operations associated with display, telephone calls, and data communications, camera operations, and recording operations. The processing component 1002 includes one or more processors 1020 programmed to execute instructions to perform all or part of the disclosed methods. In some embodiments, the processing component 1002 includes one or more modules configured to facilitate the interaction between the processing component 1002 and other components. For example, the processing component 1002 may include a multimedia module configured to facilitate the interaction between the multimedia component 1008 and the processing component 1002.

The memory 1004 is configured to store various types of data to support the operation of the device 1000. Examples of such data include instructions for any applications or methods implemented in the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 1006 is configured to provide power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen includes a liquid crystal display and a press panel. If the screen includes the press panel, the screen may be implemented as a press screen to receive input signals from the user. In some embodiments, the press panel includes one or more press sensors configured to sense presses, swipes, and other gestures on the press panel. In some embodiments, the press sensors sense not only a boundary of a press or swipe action, but also a duration time and a pressure associated with the press or swipe action. In some embodiments, the multimedia component 1008 includes a front camera and/or a rear camera. The front camera and/or the rear camera are configured to receive external multimedia data while the device 1000 is in an operation mode, such as a photographing mode or a video mode. In some embodiments, each of the front camera and the rear camera has a fixed optical lens system or has a focus and optical zoom capability.

The audio component 1010 is configured to output and/or input audio signals. For example, in some embodiments, the audio component 1010 includes a microphone configured to receive an external audio signal when the device 1000 is in an operation mode, such as a call mode, a recording mode, and a voice recognition mode. In some embodiments, the received audio signal is further stored in the memory 1004 or transmitted via the communication component 1016. In some embodiments, the audio component 1010 further includes a speaker configured to output audio signals.

The I/O interface 1012 is configured to provide an interface for the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors configured to provide status assessments of various aspects of the device 1000. For example, in some embodiments, the sensor component 1014 detects an open/closed status of the device 1000 and relative positioning of components (e.g., a display or a keypad of the device 1000). In some embodiments, the sensor component 1014 detects a change in position of the device 1000 or of a component in the device 1000, a presence or absence of user contact with the device 1000, an orientation or an acceleration/deceleration of the device 1000, and a change in temperature of the device 1000. In some embodiments, the sensor component 1014 includes a proximity sensor configured to detect the presence of nearby objects without any physical contact. The sensor component 1014 may also include a light sensor, such as a CMOS or CCD image sensor, for use in imaging applications. In some embodiments, the sensor component 1014 includes an accelerometer sensor, a gyroscope sensor, a magnetic sensor, a pressure sensor, or a temperature sensor.

The communication component 1016 is configured to facilitate wired or wireless communication between the device 1000 and other devices. In some embodiments, the device 1000 accesses a wireless network based on a communication standard, such as WiFi, 2G, 3G, 4G, or a combination thereof. In one embodiment, the communication component 1016 receives a broadcast signal or broadcast associated information from an external broadcast management system via a broadcast channel. In some embodiments, the communication component 1016 includes a near field communication (NFC) module configured to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 1000 is implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as the memory 1004 including instructions. The instructions are executable by the processor 1020 included in the device 1000, for performing the above-described methods. For example, the non-transitory computer-readable storage medium may be a ROM, a RAM, a CD-ROM, a magnetic tape, a floppy disc, an optical data storage device, and the like.

In some embodiments, there is also provided a non-transitory computer readable storage medium storing instructions that, when executed by a processor in a mobile terminal, cause the mobile terminal to execute one or more of the above screen unlocking methods. In one embodiment, the screen unlocking method includes: obtaining a sliding path on a screen when a preset operation on the screen is detected; determining a similarity between the sliding path and a preset unlocking pattern; and unlocking the screen and illuminating the screen when the similarity between the sliding path and the preset unlocking pattern is greater than or equal to a preset threshold.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing form the scope thereof. It is intended that the scope of the present disclosure only be limited by the appended claims.

What is claimed is:

1. A screen unlocking method, comprising:
   obtaining a sliding path on a screen when a preset operation on the screen is detected;
   after the preset operation is detected, illuminating the sliding path on the screen when the sliding path on the screen is detected;
   determining a similarity between the sliding path and a preset unlocking pattern;
   unlocking the screen and illuminating the screen when the similarity between the sliding path and the preset unlocking pattern is greater than or equal to a preset threshold;
   transforming a pattern corresponding to the sliding path to have a same size as the preset unlocking pattern;
   calculating a histogram of a transformed pattern corresponding to the sliding path and calculating a histogram of the preset unlocking pattern; and
   determining the similarity between the sliding path and the preset unlocking pattern according to a similarity between. the histograms.

2. The method according to claim 1, wherein obtaining the sliding path on the screen when the preset operation on the screen is detected includes:
   detecting a press operation on the screen;
   obtaining a press force of the press operation; and
   obtaining the sliding path on the screen when the press force is greater than or equal to a preset force threshold.

3. The method according to claim 1, wherein obtaining the sliding path on the screen when the preset operation on the screen is detected includes:
   detecting a press operation on the screen;
   obtaining a press duration of the press operation; and
   obtaining the sliding path on the screen when the press duration is within a preset duration range.

4. The method according to claim 1, wherein obtaining the sliding path on the screen when the preset operation on the screen is detected includes:
   detecting a press operation on the screen;
   obtaining an operation area of the press operation; and
   obtaining the sliding path on the screen when the operation area satisfies a preset condition.

5. The method according to claim 1, wherein obtaining the sliding path on the screen when the preset operation on the screen is detected includes:
   obtaining a number of tapping operations on the screen; and
   obtaining the sliding path on the screen when the number of tapping operations on the screen satisfies a preset value.

6. The method according to claim 1, wherein obtaining the sliding path on the screen includes:
   detecting a sliding operation at any location of the screen;
   judging whether a press force of the sliding operation at a beginning point is greater than a preset force threshold;
   obtaining location coordinates corresponding to the sliding operation when the press force is greater than the preset force threshold; and
   determining the sliding path based on the location coordinates.

7. A terminal, comprising: a processor; and
   a memory configured to store instructions executable by the processor, wherein the processor is configured to:
   obtain a sliding path on a screen when a preset operation on the screen is detected;
   after the preset operation on the screen is detected, illuminate the sliding path on the screen when the sliding path on the screen is detected;
   determine a similarity between the sliding path and a preset unlocking pattern; and
   unlock the screen and illuminate the screen when the similarity between the sliding path and the preset unlocking pattern is greater than or equal to a preset threshold;
   transform a pattern corresponding to the sliding path to have a same size as the preset unlocking pattern;
   calculate histogram of a transformed pattern corresponding to the sliding path and calculating a hiss gram of the preset unlocking pattern; and
   determine the similarity between the sliding path and the preset unlocking pattern according to a similarity between the histograms.

8. The terminal according to claim 7, wherein the processor is configured to obtain the sliding path on the screen when the preset operation on the screen is detected by:
   detecting a press operation on the screen;
   obtaining a press force of the press operation; and
   obtaining the sliding path on the screen when the press force is greater than or equal to a preset force threshold.

9. The terminal according to claim 7, wherein the processor is configured to obtain the sliding path on the screen when the preset operation on the screen is detected by:
   detecting a press operation on the screen;
   obtaining a press duration of the press operation; and
   obtaining the sliding path on the screen when the press duration is within a preset duration range.

10. The terminal according to claim 7, wherein the processor is configured to obtain the sliding path on the screen when the preset operation on the screen is detected by:
    detecting a press operation on the screen;
    obtaining an operation area of the press operation; and
    obtaining the sliding path on the screen when the operation area satisfies a preset condition.

11. The terminal according to claim 7, wherein the processor is configured to obtain the sliding path on the screen when the preset operation on the screen is detected by:
    obtaining a number of tapping operations on the screen; and
    obtaining the sliding path on the screen when the number of tapping operations on the screen satisfies a preset value.

12. The terminal according to claim 7, wherein the processor is configured to obtain the sliding path on the screen by:
    detecting a sliding operation at a location on the screen;
    determining whether a press force of the sliding operation at a beginning point is greater than a preset force threshold;
    obtaining location coordinates corresponding to the sliding operation when the press force is greater than the preset force threshold; and
    determining the sliding path based on the location coordinates.

13. A non-transitory computer-readable storage medium having instructions stored therein that, when executed by a processor of a terminal, cause the terminal to perform a screen unlocking method, the method comprising:
    obtaining a sliding path on a screen when a preset operation on the screen is detected;

after the preset operation is detected, illuminating the sliding path on the screen when the sliding path on the screen is detected;

determining a similarity between the sliding path and a preset unlocking pattern; and unlocking the screen and illuminating the screen when the similarity between the sliding path and the preset unlocking pattern is greater than or equal to a preset threshold;

transforming a pattern corresponding to the sliding path to have a same size as the preset unlocking pattern;

calculating a histogram of a transformed pattern corresponding to the sliding path and calculating a histogram of the preset unlocking pattern; and determining the similarity between the sliding path and the preset unlocking pattern according to a similarity between the histograms.

14. The non-transitory computer-readable storage medium according to claim 13, wherein obtaining the sliding path on the screen when the preset operation on the screen is detected includes:

detecting a press operation on the screen;

obtaining a press force of the press operation; and obtaining the sliding path on the screen when the press force is greater than or equal to a preset force threshold.

15. The non-transitory computer-readable storage medium according to claim 13, wherein obtaining the sliding path on the screen when the preset operation on the screen is detected includes:

detecting a press operation on the screen;

obtaining a press duration of the press operation; and obtaining the sliding path on the screen when the press duration is within a preset duration range.

16. The non-transitory computer-readable storage medium according to claim 13, wherein obtaining the sliding path on the screen when the preset operation on the screen is detected includes:

detecting a press operation on the screen;

obtaining an operation area of the press operation; and obtaining the sliding path on the screen when the operation area satisfies a preset condition.

* * * * *